United States Patent [19]

Molins

[11] 4,229,137
[45] Oct. 21, 1980

[54] PROCESS OF CONVEYING CIGARETTES OR OTHER ROD-LIKE ARTICLES

[75] Inventor: Desmond W. Molins, London, England

[73] Assignee: Molins, Limited, England

[21] Appl. No.: 889,014

[22] Filed: Mar. 22, 1978

Related U.S. Application Data

[62] Division of Ser. No. 681,247, Apr. 28, 1976, Pat. No. 4,099,637, which is a division of Ser. No. 276,302, May 15, 1975, Pat. No. 3,967,740.

[30] Foreign Application Priority Data

Aug. 2, 1971 [GB] United Kingdom ............... 36319/71

[51] Int. Cl.³ ............................................. B65G 65/04
[52] U.S. Cl. ..................... 414/786; 414/222; 414/404; 198/347; 198/425
[58] Field of Search ........ 414/222, 403, 404, 406–410, 414/414, 413, 786; 214/302; 198/347, 425, 422

[56] References Cited

U.S. PATENT DOCUMENTS

| | | |
|---|---|---|
| 3,107,775 | 10/1963 | Dardaine .......................... 198/425 |
| 3,314,520 | 4/1967 | Molins ............................. 198/347 |
| 3,448,846 | 6/1969 | Bardenhagen .................. 198/422 X |
| 3,470,996 | 10/1969 | Lee .................................... 198/347 |
| 3,679,079 | 7/1972 | Seragnoli ........................ 414/403 |
| 3,777,911 | 12/1973 | Bornfleth ........................ 414/222 |
| 3,854,611 | 12/1974 | Wahle ............................. 414/414 |
| 3,923,173 | 12/1975 | Schubert ......................... 414/404 |

Primary Examiner—Stephen G. Kunin
Assistant Examiner—Terrance L. Siemens
Attorney, Agent, or Firm—Craig and Antonelli

[57] ABSTRACT

A buffer store for filled and empty cigarette containers is provided between a cigarette making machine and a cigarette packing machine so that either of the machines may be kept running if the other stops. In one example the buffer store consists of separate cigarette loading and unloading stations between which the cigarette containers are carried in trolleys. In a further example, the loading and unloading stations are combined into a single unit which is adapted to either load or unload containers, depending on the operating conditions of the machines, the containers again being carried in trolleys.

11 Claims, 21 Drawing Figures

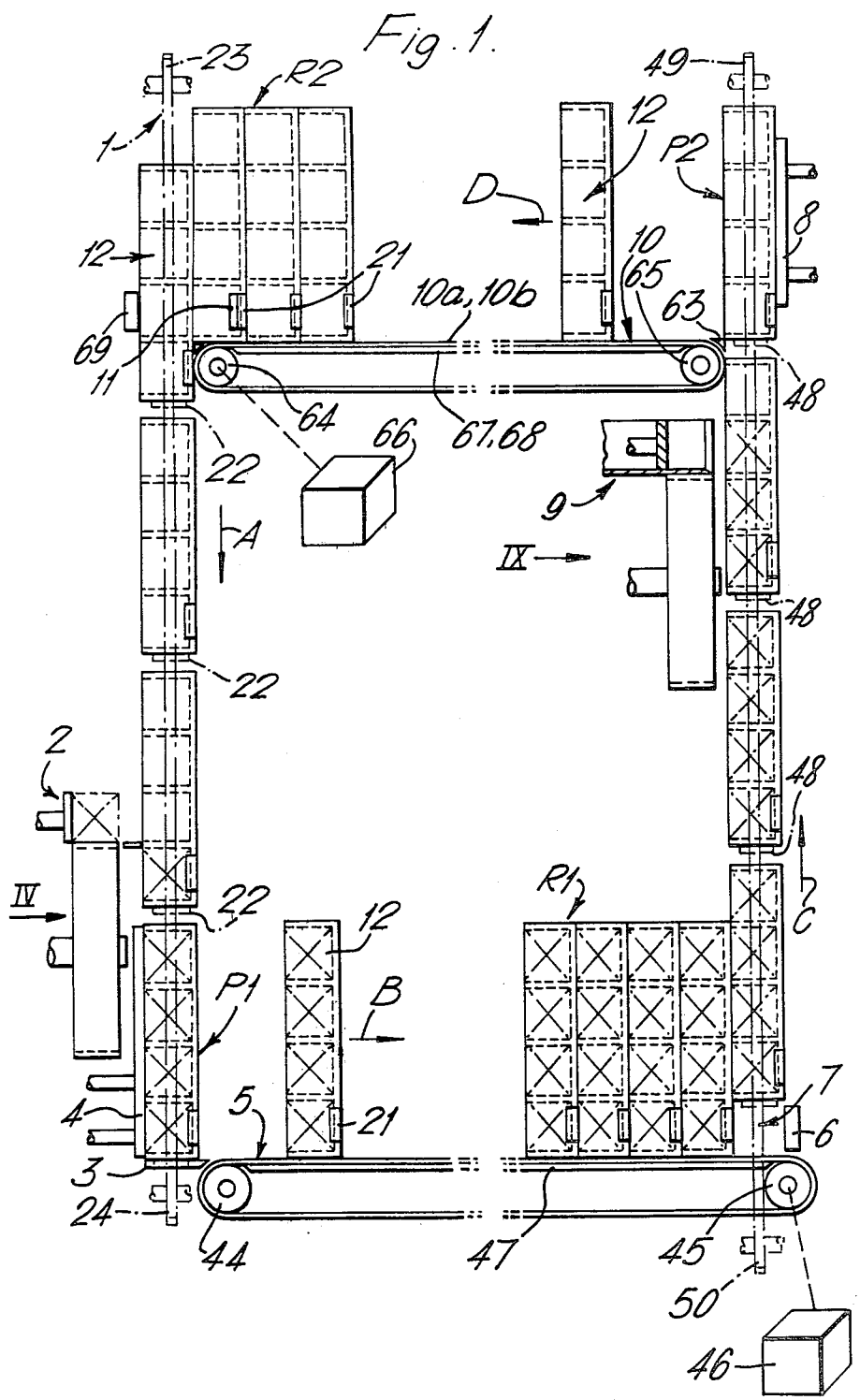

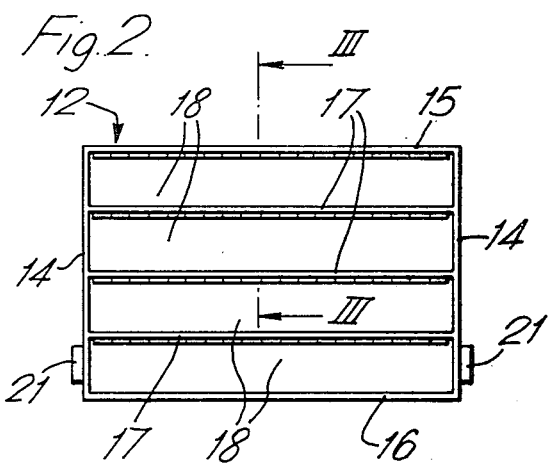
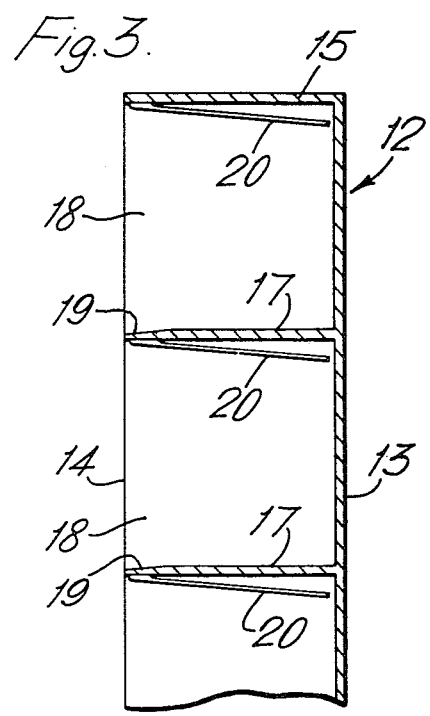

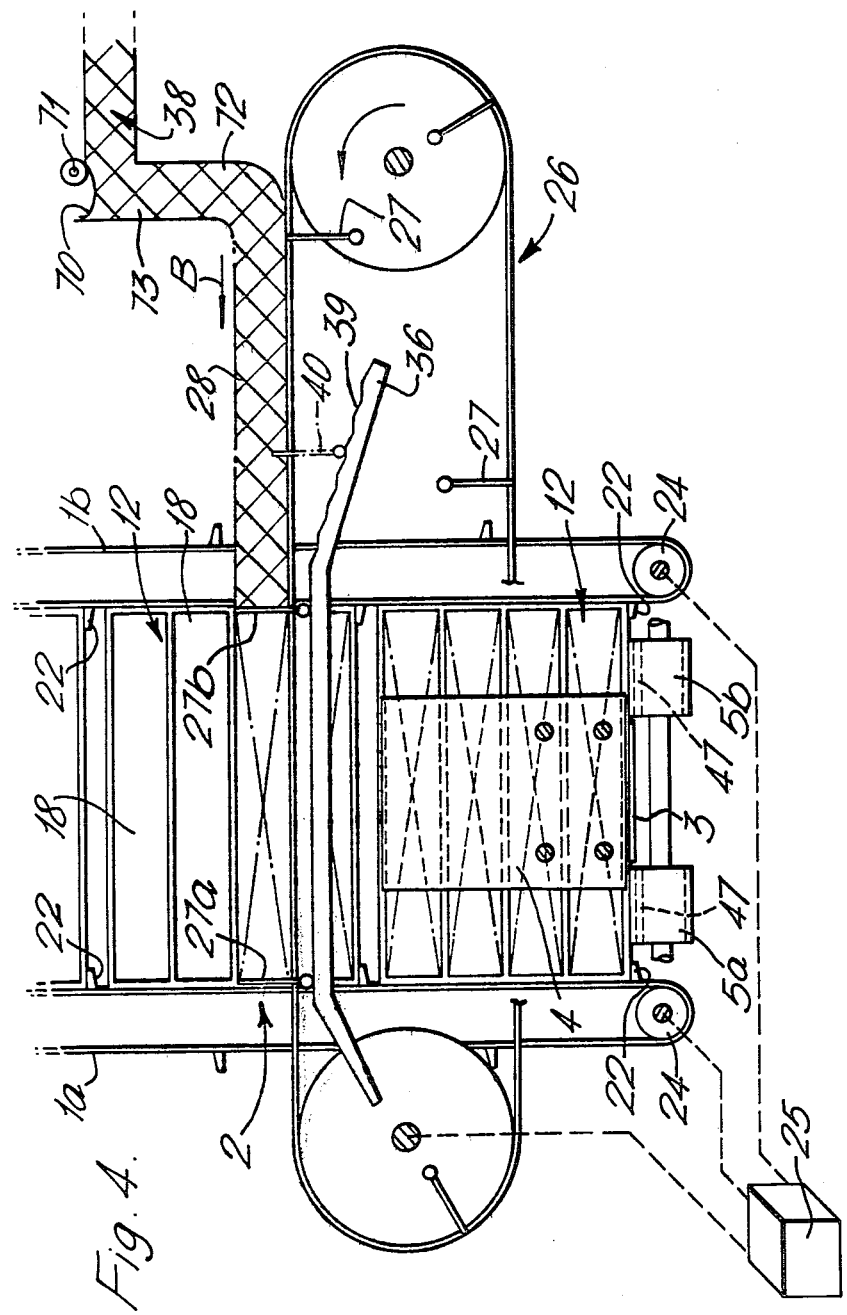

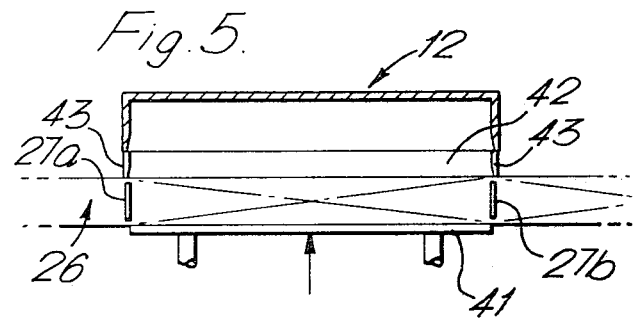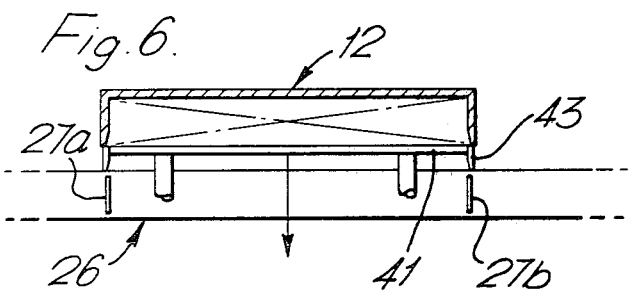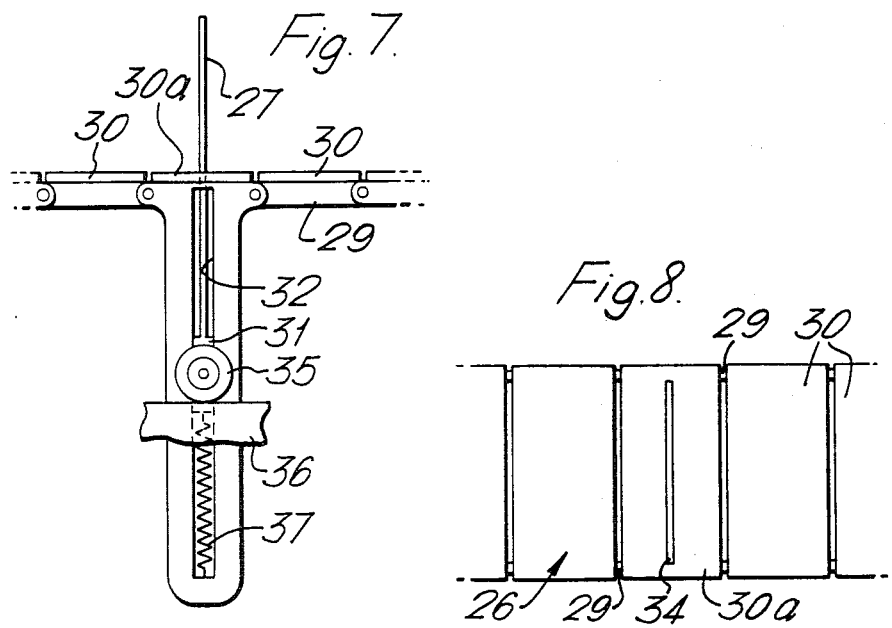

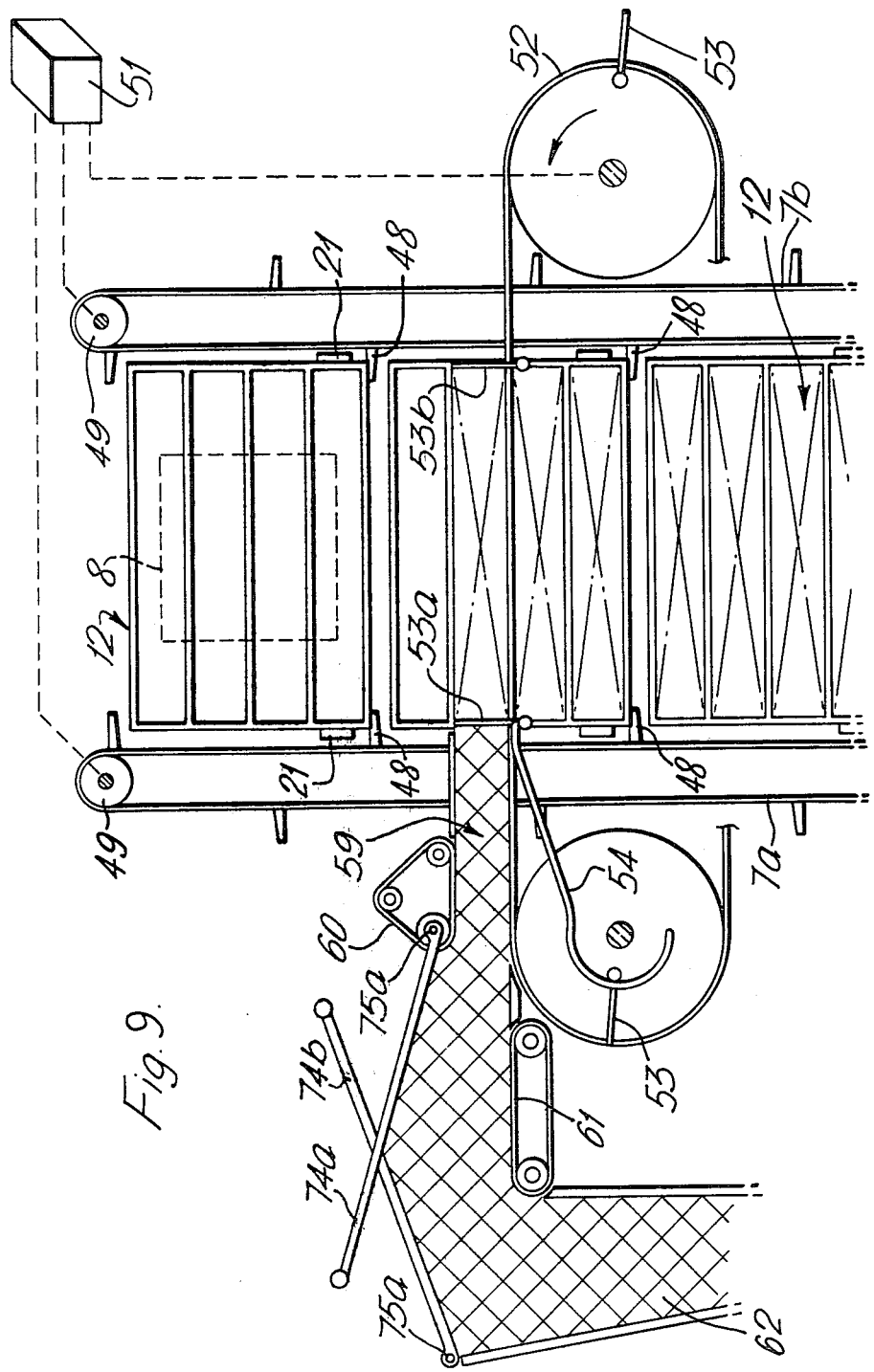

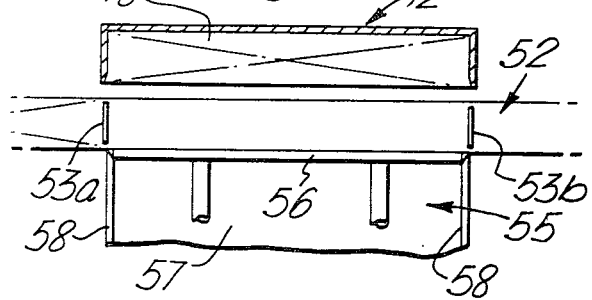
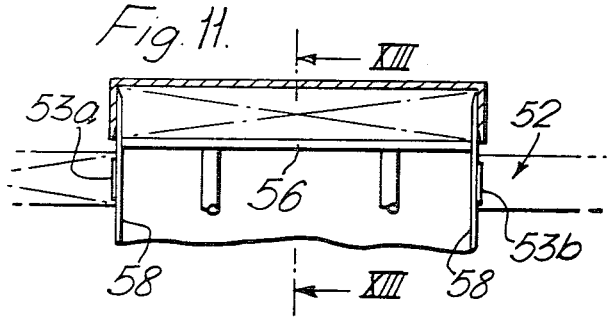
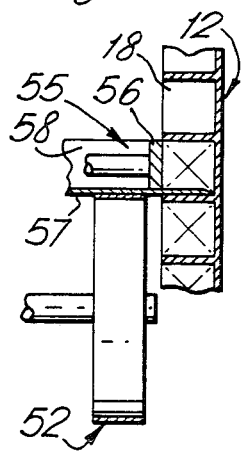
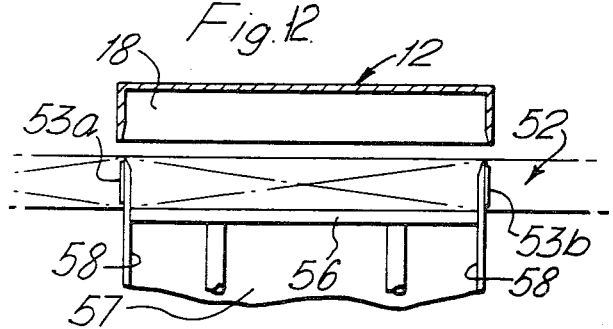

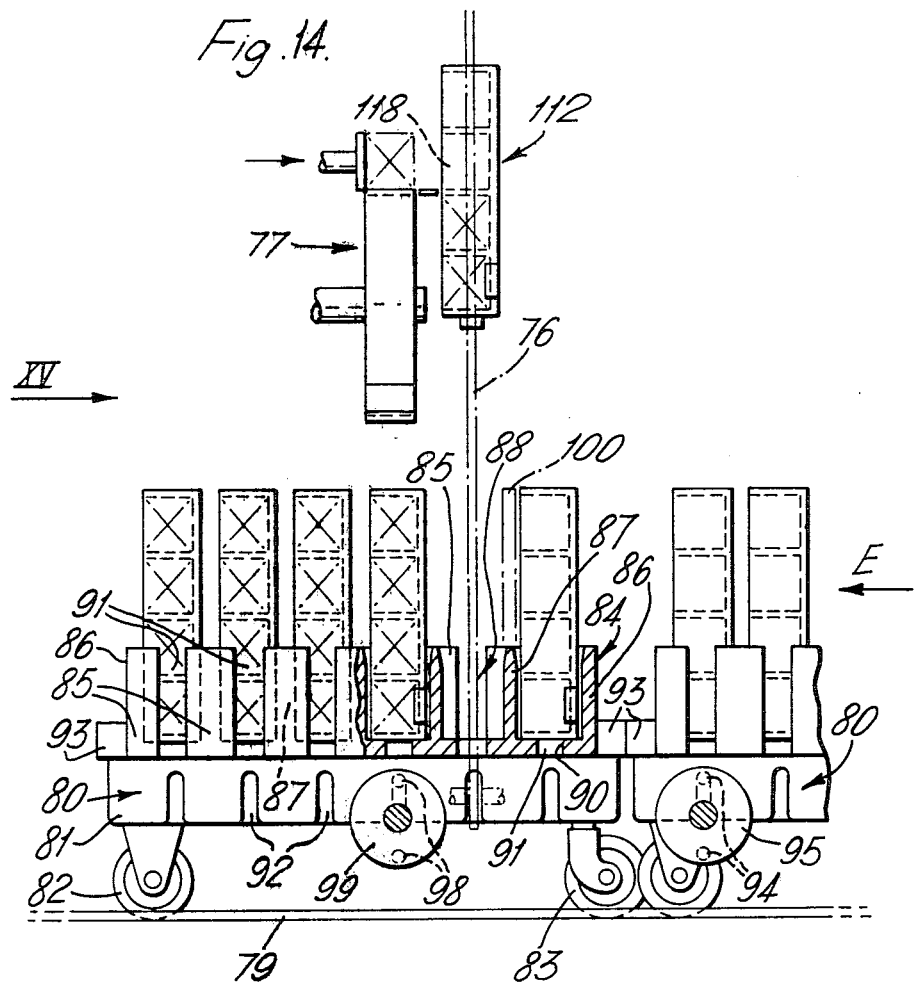

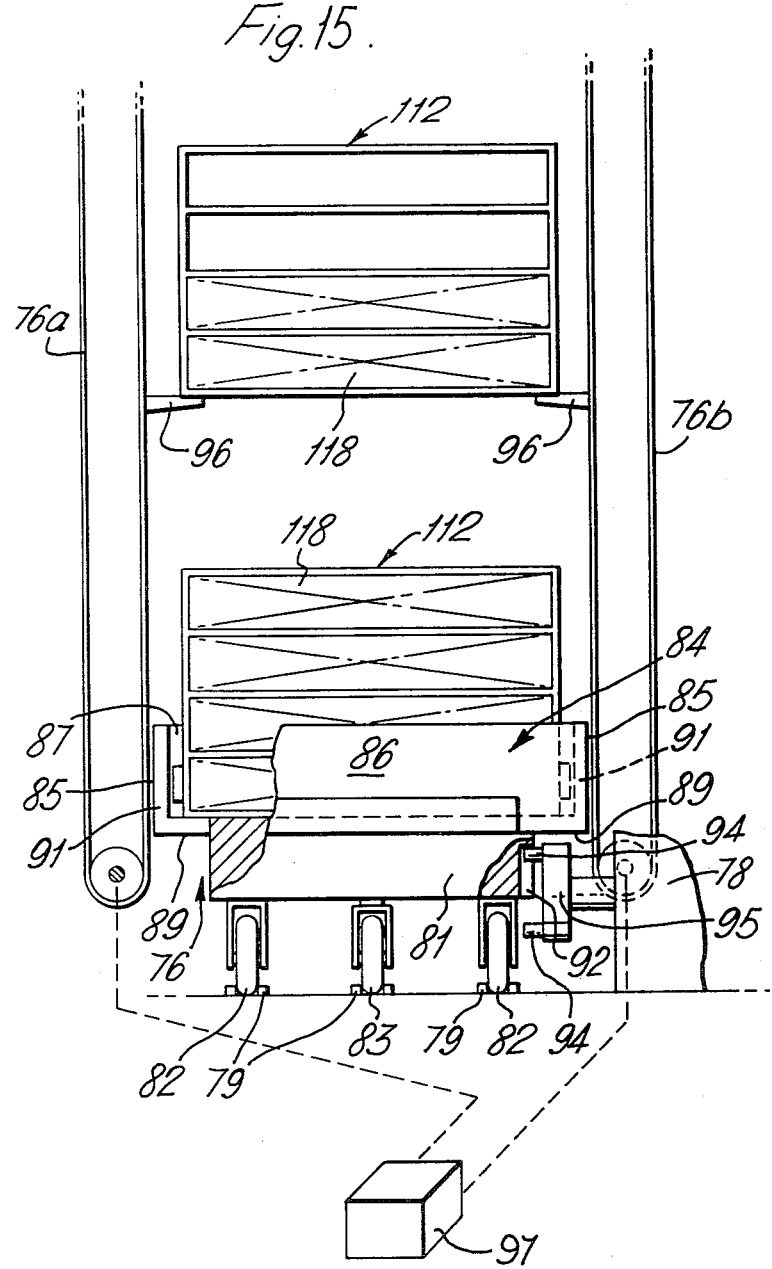

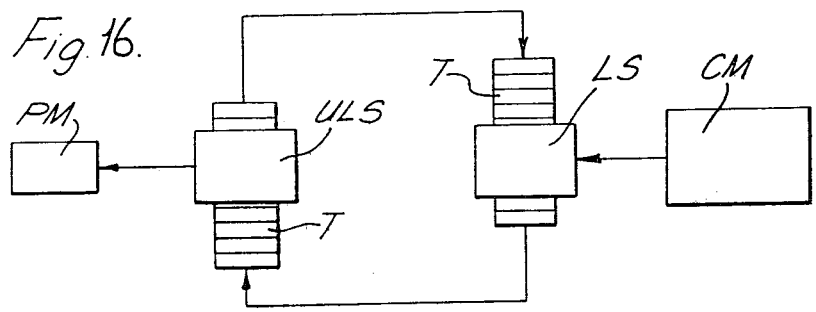
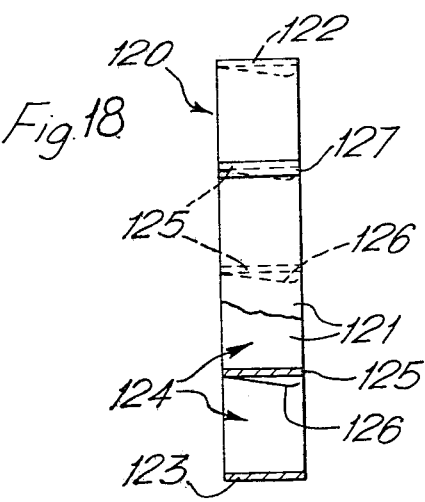
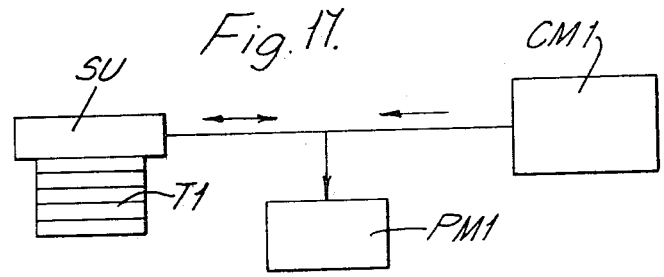

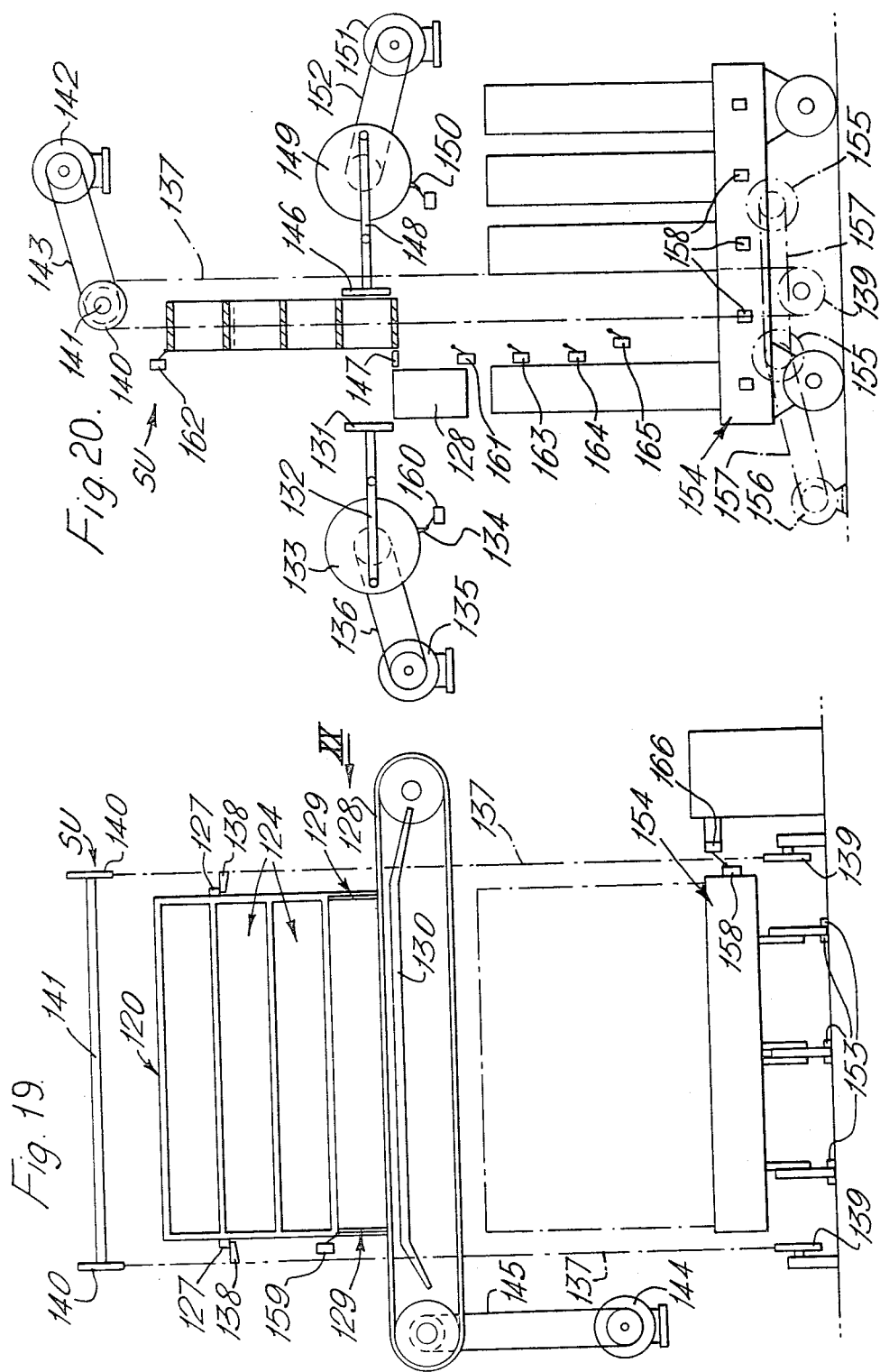

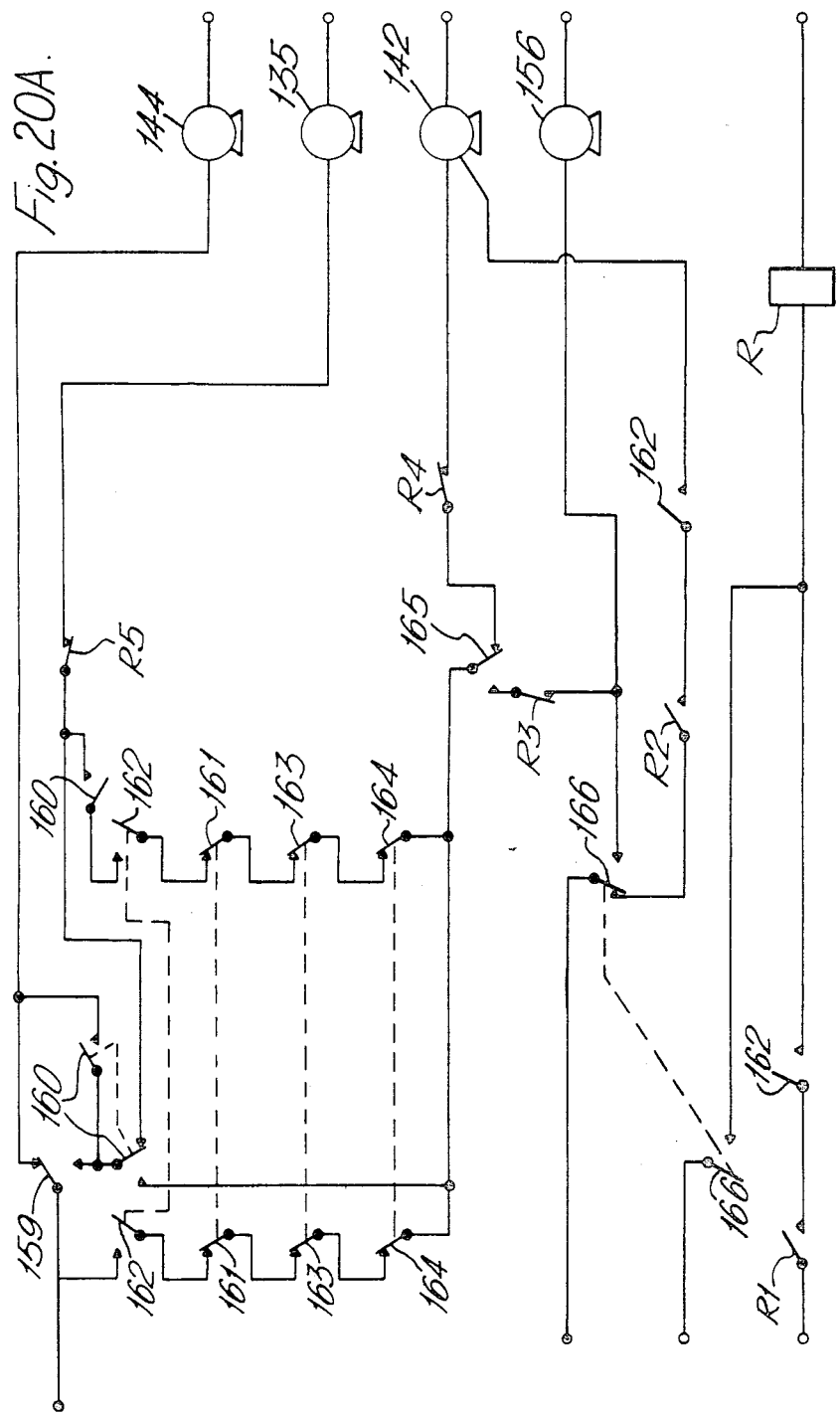

PROCESS OF CONVEYING CIGARETTES OR OTHER ROD-LIKE ARTICLES

This application is a division of application Ser. No. 681,247, filed Apr. 28, 1976, now U.S. Pat. No. 4,099,637, issued July 11, 1978, which is a division of application Ser. No. 276,302, filed May 15, 1975, now U.S. Pat. No. 3,967,740, issued July 6, 1976.

This invention relates to apparatus for handling articles, e.g., rod-like articles such as cigarettes. The invention is applicable in circumstances where articles are made by one machine and then are required to be transported to another machine for further treatment or for packing in boxes, packets or the like.

In the transport of articles between a making machine and a packing machine, for example, it may well be desirable to provide facilities for storing a quantity of the articles in transit, so that there is a buffer store between the machines so that if either of the machines is stopped for any reason the other may continue in operation for some time. It is an object of the present invention to provide apparatus for handling articles, e.g., cigarettes, which may be employed to transport articles from a making machine to a packing machine and which may be arranged to provide such a buffer store.

According to the invention there is provided apparatus for handling articles including means for feeding a first stream of such articles, means operable to separate successive leading end portions of said first stream from said first stream to form successive batches of articles, means for inserting each batch of articles into a container at a loading station, means for removing each batch of articles from said container at an unloading station, and means for feeding the removed batches away from said unloading station as a second stream of articles.

The batches may be so formed from the first stream of articles that each batch is sufficient to fill a container; preferably the containers each comprise a plurality of compartments and the batches are such that one batch is so dimensioned as to fill one compartment.

At the loading station of apparatus as above defined there is preferably provided means for intermittently driving the means for feeding the first stream, dividing means associated with said feeding means, said dividing means being operable to separate a leading end portion from said first stream to form a batch, conveyor means driven in synchronism with said feeding means for conveying said container intermittently towards a loading position, and means for moving the batch of articles formed by the separated leading end portion from said feeding means into said container whilst said feeding means and said conveyor means are stationary.

The feeding means may comprise an endless conveyor provided with divider plates which can be either retracted below the conveyor or projected therethrough to separate adjoining portions of a continuous stream of articles on the conveyor to form batches. The divider plates are so disposed and operated that the length of each portion of the stream separated to form a batch matches one dimension of the container while the other dimensions of the container are matched by the height of the stream and the length of the articles. Where as is preferred each container has two or more compartments then it is preferred to arrange that the height of each compartment matches the height of the stream.

In one form of apparatus embodying the invention a common station may serve as both the loading station and the unloading station; one endless conveyor then serves both as the means for feeding the first stream and as the means for feeding the second stream, said conveyor being operable to feed articles in one direction prior to each operation of a loading pusher serving as the inserting means and operable to feed articles in the reverse direction after each operation of an unloading pusher serving as the removing means.

In order that the invention may be well understood, a preferred embodiment thereof will now be described, reference being made to the accompanying drawings in which:

FIG. 1 is a diagrammatic side view of one form of apparatus embodying the invention, for handling cigarettes;

FIG. 2 is a front view of a container for use with the apparatus of FIG. 1;

FIG. 3 is a section on the line III—III of FIG. 2, drawn to a larger scale;

FIG. 4 is a view of part of the apparatus of FIG. 1, taken in the direction of arrow IV of FIG. 1;

FIG. 5 is a plan view of part of the apparatus of FIG. 4;

FIG. 6 is a view similar to FIG. 5 but with some parts shown in different positions;

FIG. 7 is an enlarged and more detailed view of part of the apparatus shown in FIG. 4;

FIG. 8 is a plan view of the apparatus of FIG. 7, with some parts omitted;

FIG. 9 is a view of part of the apparatus of FIG. 1, taken in the direction of arrow IX of FIG. 1;

FIG. 10 is a plan view of part of the apparatus of FIG. 9;

FIGS. 11 and 12 are views similar to FIG. 10, but with some parts shown in different positions;

FIG. 13 is a section on the line XIII—XIII of FIG. 11;

FIG. 14 shows a modified form of apparatus for conveying containers between loading and unloading stations;

FIG. 15 is a view taken in the direction of arrow XV—XV of FIG. 14 with some parts omitted;

FIG. 16 is a diagram of an arrangement of making and packing machines using separate loading and unloading stations for the containers;

FIG. 17 is a diagram of a further arrangement of making and packing machines using a combined loading and unloading station for the containers;

FIG. 18 is a view, partly in section, of a modified form of container;

FIG. 19 is a diagrammatic front view of a combined loading and unloading station for use with the machine arrangement of FIG. 17;

FIG. 20 is a diagrammatic side view of the apparatus shown in FIG. 19, looking in the direction of arrow XX of FIG. 19, and including some extra parts.

FIG. 20A is a schematic diagram of electrical circuits embodying the various switches and electric motors included in the apparatus of FIGS. 19 and 20.

Referring first to FIG. 1, the apparatus shown comprises an intermittently driven down-feed conveyor 1, a cigarette loading station 2 positioned alongside the conveyor 1 near its lower end, a stationary platform 3 and a reciprocating pusher 4, both of which are positioned adjacent the lower end of the conveyor 1. On the same level as, and forming a continuation of, the platform 3, is a continuously driven cross-feed conveyor 5 at the downstream end of which a stop 6 is provided. An intermittently driven up-feed conveyor 7 extends upwardly from the downstream end of the conveyor 5 and a further reciprocating pusher 8 is positioned adjacent the upper end of the conveyor 7. Mounted adjacent the conveyor 7 at a position below the pusher 8 is a cigarette unloading station 9. A further continuously driven cross-feed conveyor 10 extends from a position between the pusher 8 and unloading station 9 to a position adjacent the down-feed conveyor 1. A pair of retractable stops 11 are positioned at the downstream end of the conveyor 10.

The above apparatus serves for circulating containers 12 in succession, around a closed path so that cigarettes may be loaded into the containers 12 at station 2 and unloaded at station 9. Before describing the construction and operation of the apparatus in detail, a suitable form of container 12 will be described.

A container 12 is shown in detail in FIGS. 2 and 3 and consists of an open fronted box-like structure having a back wall 13, two side walls 14, a top wall 15 and a bottom wall 16. Three internal partitions 17 are mounted parallel to the walls 15, 16 at regular spacings so as to divide the interior of the container into four compartments 18 of equal height. The front top corner of each of the partitions 17 and the bottom wall 16 are chamfered, as shown at 19, to facilitate the loading and unloading of cigarettes into and out of the compartments 17. Fixed to the under-surface of the top wall 15 and each of the partitions 17 is a thin strip 20 of plastic or steel which is lightly sprung away from the surface to which it is attached. The purpose of such strips 20 will become apparent later when the operation of the apparatus is described. Protruding from the outside surface of each of the side walls 14 is a lug 21.

Empty containers 12 are fed intermittently in succession vertically downwards, as shown by arrow A (FIG. 1), by the conveyor 1 which comprises a pair of endless chain conveyors 1a, 1b arranged one on each side of the containers 12 and provided with fingers 22 on which the containers 12 are supported between the conveyors 1a, 1b as shown in FIG. 4. The conveyors 1a, 1b are supported by pairs of sprockets 23, 24, and are driven intermittently from a drive unit shown diagrammatically at 25 in FIG. 4, in steps each equal to the height of one compartment of a container 12. Thus at successive times when the conveyors 1a, 1b, come to rest successive compartments 18 of a container 12 are in position to be filled with cigarettes at the loading station 2, as will now be described with reference to FIGS. 4 to 8.

The cigarette loading station 2 comprises an endless conveyor 26 provided with divider plates 27 which can be projected through the conveyor 26 so as to subdivide a continuous stream 28 of cigarettes on the conveyor 26 into batches. The height of stream 28 and the spacing between plates 27 are such that each batch is of approximately the same height and length as a compartment 18. The conveyor 26 consists of a pair of chains 29 which support a plurality of slats 30 which together form a surface for carrying the stream of cigarettes 28. Each divider plate 27 is provided at its lower end (as viewed in FIG. 7) with a block 31 which runs in grooves 32 formed in arms 33, one such arm being carried by each of the chains 29. The slats 30 are fixed to the chain and are plain; special slats 30a are provided at positions where a divider plate 27 is fitted, each slat 30a being formed with a slot 34 (FIG. 8) through which the corresponding plate 27 can pass. Each block 31 carries a cam follower 35 which contacts a fixed cam 36 which causes each plate 27 to project upwardly through a slot 34 at the appropriate time. Each plate 27 is biased by a spring 37 to the position in which it is retracted below the slats 30. The conveyor 26 is driven intermittently, in synchronism with the conveyors 1a, 1b from the drive unit 25, so that each time it comes to rest a batch of cigarettes is positioned opposite a compartment 18.

In operation, cigarettes are fed, from one or more cigarette making machines, in any convenient manner along a path 38, on to the surface of the slats 30 on which they are formed into the continuous stream 28 which is then fed by the conveyor 26 in the direction of arrow B (FIG. 4), the height of the stream being approximately equal to the height of a compartment 17. As the conveyor 26 carries the stream 28 along, each cam follower 35 in turn contacts the cam 36 and the corresponding plate 27 will be projected up through the associated slot 34 and progressively through the stream 28 of cigarettes. The part of the cam 36 which causes this movement of the plates 27 is stepped, as shown at 39, so that the plate 27 is pushed through the cigarettes in a succession of small movements which causes less disturbance of the cigarettes than if the cam were not stepped and the plates 27 pushed through the stream in one continuous movement. A divider plate 27 is shown in chain-dot lines at 40 in an intermediate position between its fully retracted and fully projected positions.

Movement of the conveyor 26 and the stream 28 continues until two successive plates 27 have been projected right through the stream 28 at which time a batch of cigarettes will be contained between the two plates 27. In FIGS. 4, 5 and 6 two such plates shown at 27a, 27b, have reached a position such that the batch of cigarettes contained between them is opposite a compartment 18 in a container 12 and when this condition occurs the conveyor 26 is stopped. It should of course be noted that the conveyors 1a, 1b and thus a container supported thereon are also stopped at the same time. Whilst the conveyors 1a, 1b and 26 are stationary a reciprocating pusher 41 is operated, by any convenient means, to push the batch of cigarettes off the conveyor 26 and into the waiting compartment 18, a short bridge 42, having side pieces 43 being positioned between the conveyor 26 and the container 12 to support the cigarettes during transfer. The pusher 41 is then withdrawn and the conveyors 26 and 1 again start to move until the next batch of cigarettes is formed and positioned, and the container 12 moved, so that the next compartment can be loaded in the same way as just described.

As a batch of cigarettes is pushed into a compartment 18 the top of the batch will contact and lift the thin strips 20 which, after the batch has been fully pushed into the compartment, exert a light pressure on the top row of cigarettes in the batch to prevent any tendency of the cigarettes to move about and become misaligned.

After the conveyor 26 starts to move again, the plate 27a will be retracted by the spring 37 as its associated follower 35 descends the left-hand end of the cam 36 (FIG. 4).

It will be seen from FIG. 4 that the spacing of the fingers 22 on the conveyors 1a, 1b is greater than the height of a container 12, so that the spacing between the last compartment 18 to be filled in one container and the first compartment to be filled in the next succeeding empty container is greater than the spacing between successive compartments in the same container. To allow for this difference the drive to the conveyors 1a, 1b is such that every fourth stepwise movement of the conveyors 1a, 1b is of a suitably greater length so that the first compartment of each container 12 is correctly positioned opposite the pusher 41 at the loading station 2.

After all the compartments 18 of a container 12 have been filled as described above, the now full container continues to be fed intermittently downwardly by the conveyors 1a, 1b until it is deposited on the stationary platform 3, i.e. until it reaches the position P1 (FIG. 1). When a container arrives at position P1 the pusher 4 is operated, by any convenient means, to push the container off the platform 3 and on to the cross-feed conveyor 5, which comprises a pair of narrow endless conveyor bands 5a, 5b (FIG. 4) which are supported by two pairs of rollers 44, 45 and driven continuously from a drive unit shown diagrammatically at 46 in FIG. 1. The upper runs of the conveyor bands 5a, 5b run over and are supported by fixed plates 47 (FIG. 4), the container being carried horizontally in the direction of arrow B until it engages the fixed stop 6. The container is thus stopped and the conveyor bands 5a, 5b will slip beneath it.

The filled containers 12 are then fed intermittently in succession vertically upwards, as shown by arrow C (FIG. 1) by the conveyor 7 which comprises a pair of chain conveyors 7a, 7b arranged one on each side of the containers 12 and provided with fingers 48 on which the containers are supported, as shown in FIG. 9. The conveyors 7a, 7b, which are similar to the conveyors 1a, 1b are supported by pairs of sprockets 49, 50 and driven intermittently from a drive unit shown diagrammatically at 51 in FIG. 9, in steps equal to the height of one compartment of a container 12. (As with fingers 22, the spacing of adjacent fingers 48 exceeds the height of a container, hence as with the down-feed conveyor every fourth step must be correspondingly larger than the height of one compartment). Thus at successive times when the conveyors 7a, 7b come to rest successive compartments 18 of a container 12 are in position to have the batch of cigarettes contained therein removed at the unloading station 9, as will now be described with reference to FIGS. 9 to 12.

The cigarette unloading station 9 comprises an endless conveyor 52, the construction of which will not be described in detail as it is generally similar to the conveyor 26, previously described in relation to the loading station 2, in that it consists of a plurality of slats, some of which are provided with slots through which plates 53 (FIG. 9) can be moved, by a fixed cam 54, between a projecting position and a retracted position below the level of the slats.

The mounting of the plates 53 is similar to that of the plates 27, but in the case of the plates 53 each plate is biased by a compression spring (not shown) to the position in which it is fully projected through its respective slot, the cam 54 causing retraction as required. The spacing between the plates 53 is the same as that of the plates 27 i.e. the same as the length of a compartment 18, and the distance by which the plates 53 project above the conveyor 52 is equal to the height of a batch of cigarettes.

The conveyor 52 is driven intermittently, in synchronism with the conveyors 7a, 7b from the drive unit 51, so that each time it comes to rest a plate 53 is positioned opposite each side wall 14 of a container 12.

In operation, when a pair of plates 53 reach the position just described (in FIG. 9 to 12 two such plates 53a, 53b are shown in this position) the conveyor 52 is stopped. At the same time the conveyors 7a, 7b and thus a container supported thereon, are also stopped so that a batch of cigarettes in a compartment 18 is positioned opposite the space between the plates 53a, 53b.

Whilst the conveyors 7a, 7b and 52 are stationary a scoop 55 (FIGS. 10 to 13) is operated, by any convenient means, to remove the batch of cigarettes from the compartment 18 and, in cooperation with a stripper 56, place the batch on the slats of the conveyor 52 between the plates 53a, 53b. The scoop 55 is U-shaped and has a bottom 57 and two side walls 58, the stripper 56 being of such a shape as to fit inside the scoop 55, and mounted so as to be movable relative to the scoop.

When the conveyors 1a, 1b and 52 are stopped, as mentioned above, the various parts are in the positions shown in FIG. 10. To remove the batch of cigarettes from a compartment 18 the scoop 55 and the stripper 56 are moved across the conveyor 52, between the plates 53a, 53b towards the container 12. Just as the stripper 56 comes into contact with the batch of cigarettes it is stopped, but the scoop 55 continues moving, so that the bottom 57 and side walls 58 enter the compartment 18 between the batch and the respective walls 17 and 14 of the compartment, until it reaches the position shown in FIGS. 11 and 13 when it is stopped. The chamfers 19 previously mentioned when describing the construction of containers 12 ensure that the cigarettes in the compartment are not damaged as the scoop, which is also chamfered on its leading edges, enters the compartment.

The scoop 55 and stripper 56 are now withdrawn from the compartment 18, the batch, which is now contained in the scoop 55, being removed at the same time. This movement continues until the position shown in FIG. 12 is reached, i.e. the batch of cigarettes is positioned over the conveyor 52, at which time the stripper 56 is stopped, but the scoop 55 continues moving, which causes the scoop to be withdrawn from the batch of cigarettes which is thus deposited onto the conveyor 52, between the plates 53, 53a.

The conveyors 7a, 7b and 52 start to move again until the next compartment and the next successive pair of plates 53 are in position so that the batch of cigarettes contained in the compartment can be removed by another operation of the scoop 55 and stripper 56 in the manner just described.

After a batch of cigarettes has been placed between plates 53a, 53b as above described, when the conveyors 52 starts to move again the plate 53a will be retracted below the level of the conveyor 52 by the cam 54 and the leading end of the batch of cigarettes just placed on the conveyor will engage the trailing end of the previous batch of cigarettes and form part of a continuous stream 59 of cigarettes which is fed to the left, as viewed in FIG. 9, with the assistance of a conveyor band 60 engaging the upper surface of the stream 59, which band 60 is driven intermittently in synchronism with the conveyor 52. The cigarettes are then fed by a further continuously driven conveyor 61 towards the hopper of a cigarette packing machine (not shown) via a chute 62.

After all the compartments 18 of a container 12 have been emptied as described above, the now empty container continues to be fed intermittently upwardly by the conveyors 7a, 7b until it reaches the position P2 (FIG. 1), where it stops. Whilst the conveyors 7a, 7b and the container are stationary the pusher 8 is operated, by any convenient means, to push the container off the fingers 48, across a short bridge plate 63 and onto the further cross-feed conveyor 10. The conveyor 10 comprises a pair of narrow bands 10a, 10b which are supported by two pairs of rollers 64, 65 and driven continuously from a drive unit shown diagrammatically at 66 in FIG. 1, the upper runs of the conveyor bands 10a, 10b being supported by fixed plates 67, 68. In FIG. 1 only one of the bands 10a, 10b; rollers 64, 65; and fixed plates 67, 68 is visible. The container is carried by the bands 10a, 10b horizontally in the direction of arrow D until the lugs 21 each engage a retractable stop 11. The container is thus stopped and the conveyor bands 10a, 10b will slip beneath it.

The downstream end of the conveyor bands 10a, 10b, i.e. where they turn round the rollers 64, is positioned adjacent the upper end of the down-feed chain conveyors 1a, 1b. When the conveyors 1a, 1b stop in such a position that a pair of fingers 22 is opposite the conveyor bands 10a, 10b the stops 11 are retracted from the position in which they are engaged by the lugs 21 on the container, and the container is fed, by the conveyor bands 10a, 10b, on to the fingers 22, a further fixed stop 69 (FIG. 1) being provided to ensure correct positioning of the container on the fingers 22. The stops 11 are returned to their original position as soon as the container being moved onto the fingers 22 has passed clear of the stops, so that they engage the lugs 21 on the next succeeding container being carried by the conveyor bands 10a, 10b.

The operation of the apparatus so far described is so arranged that a column of filled containers 12 is formed at the right hand end (as viewed in FIG. 1) of the cross-feed conveyor 5, with the leading container engaging the stop 6, so as to create a reserve R1. A similar reserve R2, but consisting of empty containers 12, is created at the left hand end (as viewed in FIG. 1) of the further cross-feed conveyor 10, the leading container engaging the retractable stops 11.

If for any reason one or more of the cigarette making machines stops there will be fewer cigarettes being fed along the path 38. A detector arm 70, pivotally mounted at 71, (FIG. 4) rests on top of the cigarettes moving along path 38 at a position where the cigarettes are guided into the top of a vertical chute 72, through which the cigarettes pass onto the conveyor 26. The side wall 73 of the chute 72 terminates at a distance above the conveyor 26, this distance determining the height of the continuous stream 28. Fewer cigarettes passing into the chute 72 causes the arm 70 to move anticlockwise through a predetermined angle about its pivot 71, and this movement is arranged, in any convenient manner, to stop the drive unit 25 and thus make the loading station 2 inoperative. However the cigarette packing machines will be kept running, via the unloading station 9, by using the filled containers in the reserve R1.

As well as acting as a detector, as explained above, the detector arm 70 also serves as a means for allowing the chute 72 to be increased in size during each stationary period of the conveyor 26 under normal running conditions. As each batch of cigarettes is being pushed into a compartment 18 of a container 12, cigarettes will still be moving along path 38, but will be stationary in the chute 72. The effect of this will be that the flow of cigarettes along path 38 will cause the level of the cigarettes at the top of chute 72 to rise and the arm 70 will pivot in a clockwise direction as the cigarette level rises. On the next stepwise movement of the conveyor 26, the cigarettes will again start to pass along chute 72 and the arm 70 will return to its previous position.

Conversely if the cigarette packing machine stops, the number of cigarettes in the chute 62 will be increased, as batches of cigarettes continue to be removed from the containers 12 at the unloading station 9. Positioned above the top of chute 62 is a pair of coacting arms 74a, 74b pivoted at 75a, 75b respectively, which will move about their respective pivots so as to increase the space above the chute 62. When the arms 74a, 74b have moved through a predetermined angle, the drive unit 51 is stopped, in any convenient manner, and thus make the unloading station 9 inoperative. However the cigarette making machines will be kept running as the loading station 2 can be supplied with empty containers from reserve R2. The space below arms 74a, 74b accommodates a sufficient number of cigarettes to avoid interruption of flow to the packing machine during the regular brief interruptions of supply as a container at the unloading station 9 is moved by the chain conveyors 7a, 7b.

Reference will now be made to FIGS. 14 and 15 which show a modified form of apparatus for carrying containers 112, which are identical to the containers 12 described with reference to FIGS. 2 and 3, to and fro between a cigarette loading station and a cigarette unloading station.

In this form, the apparatus comprises a vertical conveyor 76, a cigarette loading station 77, which is identical with the cigarette loading station 2 (FIGS. 4 to 8), positioned alongside the conveyor 76, a drive unit 78 and three sets of guide rails 79 which are fixed to the floor alongside the drive unit 78.

The apparatus just described serves for moving trolleys 80, which are each adapted to carry a number of containers 112, stepwise past the lower end of the conveyor 76 so that the containers may be lifted from the trolley by the conveyor 76, one at a time, filled with cigarettes at the loading station 77 and returned to the trolley.

Each trolley 80 consists of a base 81 at one end of the underside of which two wheels 82 are fixed, a further wheel 83 being pivotally mounted centrally on the underside at the other end. Projecting upwardly from the top of the base 81 is an open topped box-like structure 84 having two side walls 85 and two end walls 86. Five internal partitions 87 are mounted parallel to the end walls 86 so as to divide the interior of the structure 84 into six chambers 88 of equal size, and of such dimensions as to be capable of receiving a container 112 as will be described later. The width of the chambers 88 i.e. the dimension shown in FIG. 15, is greater than that of the base 81 so that a part 89 of the structure 84 overhangs the base at each side, the overhanging part 89 being formed with a bottom wall 90 to fill the gap between the base 81 and the side walls 85. The bottom wall 90 and each side walls 85 are provided with slots 91 positioned at each end of each chamber 88. The base 81 is provided along one side with recesses 92, positioned in line with the slots 91. Fixed to each end of the top of the base 81 against the end walls 86 is a block 93.

In operation a trolley 80, carrying six empty containers 112, one in each of the chambers 88 is fed, by any convenient means, in the direction of arrow E (FIG. 14) so that the wheels 82, 83 each engage a set of guide rails 79. The trolley is fed up to a predetermined position so that the leading end face of the base 81 engages one of a pair of pins 94 carried at diametrically opposed positions on a disc 95 driven intermittently from the drive unit 78. The arrangement is such that on each half revolution of the disc 95 the trolley will be moved, in the direction of arrow E a distance equal to the pitch of the containers in the chambers 88, the pins 94 entering successive recesses 92.

When the trolley comes to rest, after a number of half revolutions of the disc 95, so that a container 112 is positioned between a pair of chains 76a, 76b, which make up the conveyor 76 the container is lifted vertically upwards out of its respective chamber 88. This is achieved by a pair of fingers 96 secured to the chains 76a, 76b which rise through the slots 91 to engage the bottom of the container 12, the chains 76a, 76b being driven from a drive unit shown diagrammatically in FIG. 15 at 97. The container 112 is lifted sufficiently to bring its lowest compartment 118 opposite the cigarette loading station 77 and then the chains 76a, 76b are stopped. The compartments of the container are then filled in turn in the same manner as described previously with reference to FIGS. 4 to 8, the chains 76a, 76b being driven intermittently in the reverse direction to lower the container in steps as its compartments are successively filled.

After all the compartments 18 have been filled the container 112 is lowered, by the chains 76a, 76b, back into the chamber 88 from which it was removed. After the container 112 has been replaced in its chamber 88 the disc 95 is rotated a further half revolution to move the trolley one container pitch and position the next empty container between the chains 76a, 76b. When the trolley comes to rest after the fourth stepwise movement of the disc 95 the recesses 92 are engaged by the pins 98 of a further disc 99 which is driven, from the drive unit 78 in unison with the disc 95.

The two discs 95, 99 are provided so that as one trolley approaches the end of its travel in the direction of arrow E under the influence of the disc 99, a further trolley can be placed behind it and fed forwardly with it. That is, whilst one trolley is still being fed forwardly by the pins 98 on disc 99, the recesses in the base of the further trolley will be engaged by the pins 94 on disc 95, and so the two trolleys will be advanced stepwise in synchronism.

The blocks 93 are provided so that when two trolleys are brought into contact, as shown in FIG. 14, the gap between their respective bases 81 provides a space equivalent to one of the recesses 92, said space being halfway between the last recess of one trolley and the first recess of the next trolley.

To prevent the cigarettes from falling out of the compartments 118 whilst the trolley is being moved about, the partitions 87 may extend upwardly the full height of the containers 112, as shown in chain-dot lines at 100 in FIG. 14.

After all the containers in a trolley have been filled as described above, the trolley is disengaged from the rails 79 and moved either directly or via a store of trolleys to a position such that the containers 112 can be removed one at a time from the trolley, have the cigarettes removed from their compartments, and returned to the trolley in the same manner as described with reference to FIGS. 14 and 15, except that filled containers would be lifted from the trolley, emptied at an unloading station, and empty containers returned to the trolley for subsequent return to the loading station 77. As the unloading station 77 is identical with the station 9 previously described, its construction and operation will not be described or illustrated.

FIG. 16 shows a diagram of a suitable form of machine layout in which apparatus as above described with reference to FIGS. 4 to 15 may be used.

Cigarettes from a cigarette making machine CM are fed, as a stream, to a cigarette loading station LS in which empty containers are removed successively from a trolley T, filled with cigarettes, and returned to the trolley. When a trolley T has been filled with containers, each filled with cigarettes, the trolley is moved, as shown by the arrow, to a cigarette unloading station ULS in which filled containers are successively removed from the trolley T, so that the cigarettes may be removed and again formed into a stream, the now empty containers being replaced in the trolley T. The stream of cigarettes formed in the unloading station ULS is then fed to a packing machine PM. When all the containers in the trolley have been emptied the trolley is moved, as shown by the arrow, back to the loading station LS.

The loading station LS may be constructed and operated as described above with reference to FIGS. 4 to 8, the unloading station may be constructed and operated as described above with reference to FIGS. 9 to 13, and the construction and operation of the trolleys T may be as described above with reference to FIGS. 14, 15.

With the apparatus so far described the loading and unloading stations are at separate locations, and in the case of the apparatus described with reference to FIGS. 14, 15 the trolleys T have to be moved between the loading and unloading stations.

However, it may be convenient, depending on the layout of a factory, to use apparatus according to the present invention in which the loading and unloading stations are combined into a single unit. A diagram of a suitable form of machine layout in which a combined loading and unloading station is used, is shown in FIG. 17.

Cigarettes from a cigarette making machine CM1 are fed, as a stream, to a cigarette packing machine PM1, and any cigarettes being so fed, in excess of the requirements of the packing machine are fed to a storage unit SU (to be described later), the flow of cigarettes to the unit SU being reversed, so that they are fed to the packing machine PM1, if the number of cigarettes coming from the machine CM1 drops below the requirements of the packing machine.

Examples of ways in which cigarettes may be formed into a stream and fed to a packing machine, with any excess of cigarettes being fed to a storage unit are described and illustrated in German Offenlegungsschrift No. 1,957,002.

The present apparatus differs from that shown and described in the above mentioned application in that the storage unit SU is used instead of the helical reservoir shown and described in the above mentioned application.

The construction and operation of storage unit SU will now be described with reference to FIGS. 18, 19, 20, and 20A.

In order that the unit SU may either load cigarettes into, or remove cigarettes from, a container, the container 12 previously described is modified to the extent that the back wall 13 is removed, as are the lugs 21. Such a modified container 120 is shown in FIG. 18 and consists of two side walls 121, a top wall 122 and a bottom wall 123. The interior is divided into four compartments 124 by partitions 125. Strips 126 are attached to the under-surface of the wall 122 and each of the partitions 125, the strips 126 serving the same purpose as the strips 20 in the container 12. A lug 127 is fixed to the outer surface of each of the side walls 121.

The storage unit SU is in the form of a combined loading and unloading station, and comprises an endless conveyor 128 provided with divider plates 129 and a fixed cam 130. The construction of the conveyor 128 and the divider plates 129 is the same as previously described with reference to FIGS. 4, 7 and 8 so will not be further described here. The conveyor 128 is driven from a motor 144 by a chain 145. A reciprocating pusher 131 is positioned adjacent the conveyor 128, the pusher being connected, by a connecting rod 132, to a crank disc 133 provided with a projection 134, and drivingly connected to a motor 135 by a chain 136.

A pair of vertical endless chain conveyors 137 are positioned adjacent the conveyor 128, but on the opposite side thereof to that of the pusher 131, the chains 137 being spaced apart by a distance such that a container 120 may be raised or lowered, as will be described later, past the pusher 131. For this purpose each chain has a finger 138 fixed to it, which at appropriate times engages one of the lugs 127 on the container 120. The chains 137 extend between lower freely rotatable sprockets 139, and upper sprockets 140, the latter being fixed to a common drive shaft 141 which is driven from a motor 142 by a chain 143.

A further reciprocating pusher 146 is positioned opposite the pusher 131 so that when the pusher 146 is at the limit of its movement to the right (as viewed in FIG. 20) there is room for a container 120 to be moved vertically between a short bridge piece 147 and the pusher 146. The pusher 146 is connected, by a connecting rod 148, to a crank disc 149 provided with a projection 150 and drivingly connected to a motor 151 by a chain 152. The bridge piece 147 is positioned between the edge of the conveyor 128 and a container 120 in the position at which a batch of cigarettes is either pushed into or out of a compartment 124 by pushers 131, 146 respectively, as will be described later.

Positioned below the conveyor 128 and extending along the floor between the chain conveyors 137 are three sets of guide rails 153 along which trolleys 154 are moved stepwise by a pair of drive members 155 (which correspond to the discs 95, 99 of FIGS. 14, 15), driven in unison from a motor 156 by chains 157. The construction of the trolley 154 is similar to the trolley 80 described with reference to FIGS. 14, 15 so will not be described again here. However the trolley 154 has a number of projections 158 fixed to that side thereof nearest to the drive members 155 as the trolley is moved along the rails 153, the number of projections corresponding to the number of containers 120 in the trolley 154.

The operation of the storage unit SU will now be described. Referring first to FIG. 17, it will be assumed that the machine CM1 is producing cigarettes in excess of the number that machine PM1 is packing. Under these conditions the excess of cigarettes is fed to the storage unit SU.

With this condition prevailing reference will now be made to FIGS. 19, 20. It will be assumed that a container 120 is stationary and in a position such that the lower most compartment 124 is opposite the pusher 131.

The cigarettes are fed as a continuous stream onto conveyor 128, which is driven by motor 144. The stream is divided into batches by divider plates 129, as previously described with reference to FIGS. 4, 7 and 8. When two successive plates 129 have reached a position such that the batch of cigarettes contained between them is opposite the lowermost compartment 124 in the container 120, the leading plate 129 (considered in the direction of movement of conveyor 128) of the pair of successive plates operates a switch 159 which causes the motor 144, and therefore also the conveyor 128, to stop and the motor 135 to start. This causes the pusher 131, by means of the crank 133, to move to the right in FIG. 20 and push the batch of cigarettes off the conveyor 128, across the bridge piece 147, and into the waiting compartment 124. Before the pusher 131 is fully returned to its starting position the projection 134 on crank 133 operates a switch 160 which causes motors 142 and 144 to start and motor 135 to stop. Motor 142 causes the chains 137 to move so that the container 120 moves vertically downwards until the container operates a switch 161 which stops motor 142, at which time the next compartment 124 is positioned opposite the pusher 131. At the same time the next batch of cigarettes is being formed, as previously described, on conveyor 128. As the container starts to move downwards, a switch 162 causes switch 160 to be by-passed and motor 135 to start, which brings the pusher 131 back to its starting position. When the pusher 131 reaches this position the projection 134 disengages from switch 160 which causes motor 135 to stop. The tray remains stationary until the next divider plate 129 operates switch 159 and the cycle of operations above described is repeated to fill the next compartment 124. After this cycle of operations has been carried out four times all four compartments in the container will be filled with cigarettes. It should be noted that the container is stopped during each cycle after the first cycle of operations by successive switches 161, 163 and 164, and it is these switches in turn which cause the switch 160 to be by-passed, as explained above, so that the pusher 131 may always be returned to its starting position.

After the container 120 has been completely filled with cigarettes the motor 142 will be started, as described above, and the container will be moved vertically downwards until it comes to rest in the trolley 154. At this time chains 137 are still moving and the fingers 138 move away from the lugs 127 until one of them operates a switch 165 which causes the motor 142 and therefore the chains 137 to stop.

When the trolley 154 arrived at the position shown in FIG. 20 one of the projections 158 on the trolley operated a switch 166 (FIG. 19) which stopped the motor 156 and therefore the trolley.

Operation of switch 165 by a finger 138 also causes the switch 166 to be by-passed and the motor 156 to start. This causes the drive members 155 to rotate and the trolley 154 will be moved, as described with reference to FIGS. 14, 15, to position the next empty container between the chains 137. When the trolley reaches this position the next projection 158 operates switch 166 which causes motor 156 to stop, and the motor 142 to start but this time in the opposite direction, so that the fingers 138 engage the lugs 127 on the empty container and lift it upwards away from the trolley. The container is lifted upwards until it operates switch 162 which causes the motor 142 to stop. When this happens the lowermost compartment in the container is positioned opposite the pusher 131. Whilst the change of containers, as just described, has been taking place the next batch of cigarettes has been formed and the switch 159 operated. The arrangement however, is such that the motor 135 will not start until the empty container has operated switch 162. All the time that the condition of the machines CM1 and PM1 is such that the machine CM1 is producing an excess of cigarettes to the requirements of the machine PM1, the above described operations will continue and a store of cigarettes will be built up in the unit SU. The operations described above will also occur if, for some reason the packing machine stops. In this case however, the whole of the output of the machine CM1 will be fed to the storage unit SU.

The unit SU can also be used to remove batches of cigarettes from the compartments 124 and reform the stream on the conveyor 128, the stream then being fed away from the unit SU to the machine PM1. This condition becomes necessary if, for example, the machine CM1 stops, so that no cigarettes are being fed to the machine PM1. When this condition occurs a signal is generated at the machine CM1 which causes the motors 144, 142 and 156 to drive the parts to which they are connected in the reverse direction to that in which they were driven as described above. The signal from the machine CM1 also causes the motor 135 to be isolated and the motor 151 to be brought into operation.

The sequence of operations is in the main the same as the sequence already described except that containers filled with cigarettes are removed from the trolley, and the pusher 146 is operated instead of pusher 131. As each compartment 124 is stopped opposite the pusher 146 and two successive plates 129 are opposite the compartment 124, the trailing plate 129 (considered in the direction of movement of conveyor 128) operates switch 159 to start motor 151 and cause pusher 146 to push the batch of cigarettes out of the compartment 124 and onto the conveyor 128 between the two plates 129. The operation of the pusher 146 is the same as previously described with respect to pusher 131. As the conveyor is moved, and thus also the batch of cigarettes contained between successive pairs of plates 129, the leading plate 129 (considered in the direction of movement of the conveyor 128) will be withdrawn, by running down the fixed cam 130, below the upper run of conveyor 128 so that a continuous stream of cigarettes is reformed and fed towards the machine PM1 for subsequent packing.

As described above, when the unit SU is being used to remove cigarettes from the compartments 124, the container is moved stepwise downwards by the conveyor 137. However, it could be arranged that the cigarettes be removed from the container as the latter is moved stepwise upwards. In this case a set of switches and associated circuitry, similar to that shown in FIGS. 19-20A would be necessary, the switches being the equivalent of switches 162, 161, 163, 164 and positioned so that they would be operated in turn as the container moves upwards after each compartment had been emptied of cigarettes.

The storage unit SU will continue removing batches of cigarettes from containers until the machine CM1 again starts to supply cigarettes to the machine PM1, at which time the motors 144, 142 and 156 are again reversed and the unit SU will again start to fill containers with cigarettes as described above. The arrangement is such that the unit SU can at any stage of its operation be reversed from filling to emptying containers, or vice-versa.

It should be noted that a container such as described with reference to FIG. 18 could be used in conjunction with the machine layout shown in FIG. 16. In this case the unloading station ULS is modified by removing the scoop 55 (FIGS. 10 to 13) and using the stripper 56 as a pusher to remove the batch of cigarettes from a compartment of a container by pushing them in the same direction, relative to the stationary container, as that in which they were moved when being pushed into the container in the loading station LS. This, of course, necessitates the containers being moved vertically between the stripper 56 and the conveyor 52.

The arrangement of machines shown in FIG. 17 may be modified in a variety of ways. For example, a plurality of machines CM1 and PM1 may be linked to a single unit SU to provide a cigarette making and packing system. A number of such systems may be provided, along with a separate packing only system, which consists of one or more packing machines linked to a single storage unit SU. With this arrangement the separate packing system may be kept operating by moving trolleys, from any number of the making and packing systems, to the single storage unit. Trolleys may also be moved from one making and packing system to any other, depending on the operating conditions prevailing in each system. With this arrangement of machines, each of the units SU will be either feeding cigarettes to, or removing cigarettes from, containers, again depending on the operating conditions prevailing in each system.

FIG. 20A is a schematic diagram of electric circuits embodying the various switches and motors referred to above and need not be described in detail as the circuit arrangement shown is only what is necessary to cause the operations described above. It is noted that in addition to the switches already identified by reference to other Figures, FIG. 20A includes a relay which has a coil R and five contact pairs R1-R5 inclusive; said relay in conventional manner prevents energisation of the motors in such manner as to produce conflicting movements of parts of the apparatus.

What is claimed is:

1. A method of conveying cigarettes or other rod-like articles comprising the steps of conveying a stream of rod-like articles towards a loading station in a direction transverse to their lengths, forming the articles into confined batches, moving successive batches into containers at the loading station, moving containers filled with batches of articles away from the loading station, delivering a succession of containers filled with batches of articles to an unloading station at which the batches of articles are pushed successively out of the containers and are received by retaining means, and conveying from the unloading station, as a continuous stream, the articles received by the retaining means.

2. A method as claimed in claim 1 in which a common station serves as the loading and unloading station and in which the path of said stream being conveyed towards the loading station and the path of said stream being conveyed away from the loading station have a common portion over which the articles are conveyed in a direction depending on whether batches are being separated from or reformed into said stream.

3. A method of handling rod-like articles comprising the steps of conveying a continuous stream of rod-like articles between at least one article producing machine and at least one article packing machine, and controlling the net flow of rod-like articles in said stream by transferring rod-like articles from the stream into one or more containers to vary said flow and by transferring rod-like articles from a container into the stream as required to vary said flow, and further comprising transferring articles to or from a container in a subsidiary stream which joins said stream, and conveying said subsidiary stream in opposite directions depending on whether rod-like articles are being transferred to or from a container.

4. A method of handling rod-like articles comprising the steps of conveying a stream of rod-like articles away from at least one article producing machine and towards at least one article packing machine, transferring articles directly from said stream into a container, transferring articles directly to said stream from a container so that articles from said container are subsequently conveyed in a continuous stream toward said article packing machine or machines, conveying empty containers and full containers from an external source of containers into position for said respective transfer of articles, and controlling the transfer of articles to or from the stream to adjust the net flow of said stream from the producing machine or machines according to the demand of the packing machine or machines.

5. A method according to claim 4 including the step of moving a container intermittently through a transfer position with said stream.

6. A method according to claim 4 including the step of transferring batches of articles which comprise complete sections of said stream.

7. A method according to claim 6 wherein the batches are transferred in a direction parallel to the lengths of the articles in said stream.

8. A method according to claim 4, wherein the stream comprises a multi-layer stack of articles, further comprising the step of dividing said stream into batches for transfer into a container by progressively separating said stream into batches as it is conveyed away from said producing machine or machines.

9. A method of handling rod-like articles comprising the steps of conveying a stream in the form of a multi-layer stack of rod-like articles away from at least one article producing machine and towards at least one article packing machine, transferring articles directly from said stream into a container, forming a discontinuity in said stream, transferring articles directly to said stream from a container by transferring a batch of articles from a container into a space constituting said discontinuity, reforming a continuous stream including said batch, conveying empty containers and full containers from an external source of containers into position for said respective transfer of articles, and controlling the transfer of articles to or from the stream to adjust the net flow of said stream from the producing machine or machines according to the demand of the packing machine or machines.

10. A method according to claim 9, wherein said discontinuity is defined by spaced retaining means, including the step of progressively withdrawing said retaining means from the stream as the stream is conveyed towards the packing machine or machines.

11. A method of handling rod-like articles comprising the steps of conveying a stream of rod-like articles away from at least one article producing machine, successively transferring articles from said stream into containers, successively transferring articles from said containers to reform a continuous stream of articles from batches of articles in the containers, conveying said continuous stream to at least one article packing machine, and controlling the transfer of articles to or from containers according to the production of the producing machine or machines and the demand of the packing machine or machines.

* * * * *